D. B. STEELE.
RESILIENT TIRE.
APPLICATION FILED MAR. 3, 1919.
1,306,287.
Patented June 10, 1919.
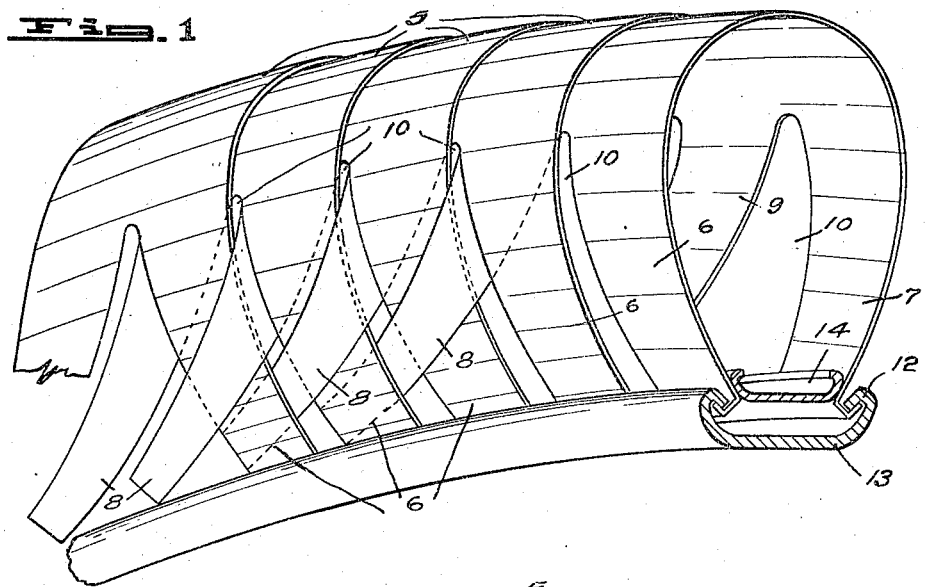
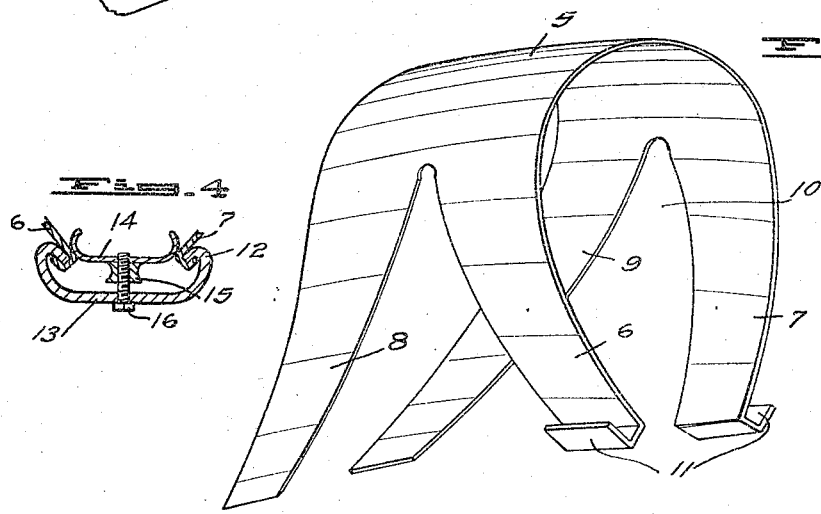
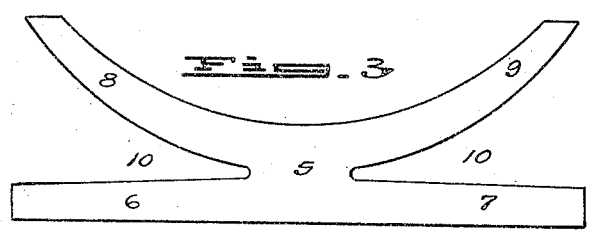
Inventor
Daniel B. Steele
By his Attorney
Frank Warren

UNITED STATES PATENT OFFICE.

DANIEL B. STEELE, OF SEATTLE, WASHINGTON.

RESILIENT TIRE.

1,306,287.  Specification of Letters Patent.  Patented June 10, 1919.

Application filed March 3, 1919. Serial No. 280,288.

*To all whom it may concern:*

Be it known that I, DANIEL B. STEELE, a citizen of the United States, residing at Seattle, in the county of King and State of Washington, have invented a certain new and useful Improvement in Resilient Tires, of which the following is a specification.

My invention relates to improvements in resilient tires and the object of my invention is to provide a spring tire that is possessed of great resiliency and elasticity, that is strong and durable, that is relatively cheap and simple to construct and that is adapted for use on automobiles in place of pneumatic tires.

A further object is to provide a spring tire that is constructed in sections so that if one section is broken it may be replaced without necessitating the replacement of the entire tire.

A still further and more specific object is to provide a spring tire that is constructed in such manner that the side walls of the tire are reinforced and strengthened by diagonally arranged members in the regions where the greatest flexure occurs.

While I have described my invention as a spring tire that is adapted to be used independently of a rubber casing it will be understood that a form of construction embodying my invention may be advantageously used within a tire casing to replace the ordinary inner tube.

The invention consists in the novel construction adaptation and combination of parts of a spring tire as will be more clearly hereinafter described and claimed.

I accomplish these objects by devices illustrated in the accompanying drawings, wherein—

Figure 1 is a view in perspective of a section of a tire constructed in accordance with my invention;

Fig. 2 is a detached view in perspective of one of the springs of which my tire is constructed;

Fig. 3 is a plan view on a reduced scale of one of the springs after it has been stamped out and before it has been bent into its final form; and Fig. 4 is a fragmentary view illustrating the mechanism used for securing the tire to the wheel rim.

Referring to the drawings, throughout which like reference numerals indicate like parts, in Fig. 3 I have illustrated a spring which is stamped from a substantially rectangular piece of spring steel into the form shown, such spring comprising a solid central portion 5 from which projects four arms 6, 7, 8 and 9, the arms 6 and 7 being substantially straight and projecting in opposite directions and the arms 8 and 9 projecting outwardly in the same general direction as the arms 6 and 7 and being curved away from such arms 6 and 7 and separated therefrom by spaces 10.

After the springs are stamped out as shown in Fig. 3 they are bent into substantially the form of an ordinary pneumatic tire casing, as shown in Fig. 2 and the ends of the arms 6 and 7 are bent upwardly to form hook shaped members 11 that are adapted to engage with the hook shaped edges 12 of the wheel rim 13.

When the springs are assembled to form a tire as shown in Fig. 1 the hooks 11 on the arms 6 and 7 are in engagement with the hook portions 12 of the wheel rim 13, the adjacent spring members overlap each other substantially one half of their width and the curved arms 8 and 9 of each spring member project outwardly through the openings 10 of the first adjacent spring member by which they are overlapped thence extend over the arms 6 and 7 of the second adjacent spring member and thence under the arms 6 and 7 of the third adjacent spring member thus forming on the sides of the tire a basket weave arrangement of the spring arms 6, 7, 8 and 9 which tends to greatly strengthen the side regions wherein the greatest flexure occurs when the tire is in use.

The spring members are secured to the wheel rim 13 by a hoop like sectional clamping ring 14 that is provided at frequent intervals with inwardly projecting studs 15 and is secured to the wheel rim 13 by screws or bolts 16, as more clearly shown in Fig. 4, so that it may be drawn tightly down on the spring arms 6 and 7 at the point where they engage the hook-shaped portions 12 of the wheel rim to securely bind the springs to the wheel rim.

When the tire is in use any portion thereof that encounters an obstruction will yield or be deflected thereby absorbing the shock in much the same manner as a pneumatic tire.

The manner of interweaving the spring arms on the sides of the tire greatly strengthens the entire tire structure and causes adjacent spring sections to brace one another and to mutually contribute to produce a tire having a great durability and elasticity.

Obviously changes in the precise form of construction and arrangement of the various parts of my invention may be resorted to within the scope of the following claims.

What I claim is:

1. A tire of the class described comprising a plurality of overlapping spring sections, each of said sections consisting of a solid medial portion arranged to form the tread of the tire and two spring members on each side of said medial portion arranged to form the sides of the tire, one of the spring members on each side being provided on its end with rim engaging means and the other spring member on each side of each spring section being curved away from the rim engaging member and arranged to be interwoven with the spring members on the sides of adjacent spring sections.

2. A tire of the class described comprising a plurality of spring sections arranged in overlapping relation around a rim each of said spring sections comprising a solid central portion having two integrally formed spring members projecting from each side thereof, one of said spring members on each side having a rim engaging hook formed on the end thereof and being arranged to extend around the tire in a substantially radial direction; and one spring member on each side being curved away from said first named spring member and arranged to extend diagonally around the side of the tire and being interwoven over and under the first named spring members of adjacent spring sections.

In witness whereof, I hereunto subscribe my name this 25th day of February, A. D. 1919.

DANIEL B. STEELE.

Copies of this patent may be obtained for five cents each, by addressing the "Commissioner of Patents, Washington, D. C."